Patented June 22, 1937

2,084,511

UNITED STATES PATENT OFFICE 2,084,511

HYDROGEN PRODUCTION CATALYSTS

James K. Small, Hudson View Gardens, N. Y., assignor to Standard-I. G. Company

No Drawing. Application September 2, 1933, Serial No. 688,029

6 Claims. (Cl. 23—212)

This invention relates to an improved method for producing hydrogen and more particularly to the production of hydrogen by reaction of hydrocarbons with steam or other suitable oxidizing gases over an improved catalyst containing phosphates.

Hydrogen may be produced by reaction of hydrocarbons with an oxygen containing gas such as steam, carbon dioxide or free oxygen, the carbon of the hydrocarbons being oxidized and the hydrogen liberated. The reaction may be illustrated as follows:

$$CH_4 + H_2O = CO + 3H_2$$

This reaction is catalyzed by iron, nickel, cobalt and a number of other metals, those having atomic weights of 52 to 59 being generally considered the most active.

It has now been found that an improved catalyst for this reaction may be prepared by admixing suitable metallic catalysts or reducible compounds thereof with phosphates of metals having refractory oxides, that is oxides which are stable under the conditions of the process at temperatures up to or above about 1600° F. such as those of the alkaline earth metals. The phosphoric acid compound used may be basic, neutral or acidic and is preferably substantially neutral. The term phosphate as used in this invention includes orthophosphates, hydrophosphates, pyrophosphates, metaphosphates and other salts of acids of phosphorus which are stable at high temperatures or which are converted on heating into phosphates which are stable at the reaction conditions used for the preparation of hydrogen. The catalyst may be prepared with a mixture of phosphates and with mixed phosphates such as potassium magnesium dimetaphosphate, sodium magnesium phosphate, magnesium ammonium phosphate, sodium magnesium pyrophosphate, and the like.

The phosphates of magnesium are preferred and mixed phosphates which are substantially neutral containing magnesium and sodium or potassium have been found especially suitable for this invention.

The catalyst may be prepared in any manner by which an intimate admixture of the catalytic metal and the phosphoric acid compound is secured. The phosphoric acid compound may be heated to a high temperature, for example 1600° F., powdered and shaped into pills or briquettes and impregnated with solutions of a readily reducible or heat decomposable compound of a catalytic metal such as nickel nitrate. A phosphate such as magnesium hydrophosphate or pyrophosphate may be prepared in a finely powdered form and may be made into a paste with a concentrated solution of nickel nitrate. The paste may then be dried, heated carefully to decompose the nitrate and shaped into cubes, pills or briquettes, with or without the application of pressure. An especially intimate mixture may be prepared by simultaneous precipitation of the catalytic compound and the desired phosphate from a mixed solution of salts of the respective metals. For example, mixed phosphates of nickel and magnesium may be precipitated by addition of phosphoric acid to a solution of salts of these metals. The precipitate may be dried and shaped into cubes or pills as above. It is preferable to activate such catalyst by a preliminary reduction of the catalytic metal component with hydrogen at the reaction temperature in order to obtain high initial activity.

The composition of the catalyst may be adjusted as desired. Suitably active catalysts will generally contain more than about 5% of the catalytically active metal, such as nickel, and catalysts containing from about 20% to 50% of the catalytically active metal and 20 to 50 or 75% of the phosphates are preferred. The catalyst composition may also contain other constituents which may be added as fillers, binding agents, or promoters. Such constituents include phosphoric acid and the refractory oxides such as alumina, prepared synthetically or used in naturally occurring compositions such as bauxite and kaolin, and mixtures thereof.

It is to be understood that this invention is not limited to any particular form in which the herein described catalyst may exist during actual use in the production of hydrogen. It is recognized that changes may occur therein due to the high temperatures and the reducing action of the gases used.

The following example illustrates one method for preparing hydrogen with the herein disclosed catalyst: A refinery gas consisting of the uncondensed fractions resulting from the cracking of petroleum oils and containing about 50% methane, a small amount of hydrogen and the remainder consisting of paraffins and olefines mainly of two to four carbon atoms is washed with aqueous caustic soda to remove substantially all sulfur present. The purified gas is then mixed with an excess of steam above that required for complete conversion of the carbon of the hydrocarbons to carbon dioxide, for example, about five volumes of steam and is passed at a temperature of about 1600° F. over a catalyst consisting of an intimate mixture of equal amounts of finely divided nickel and magnesium pyrophosphate. The resulting gas contains hydrogen, oxides of carbon and excess steam and is substantially free of unreacted hydrocarbons.

Hydrogen may be similarly prepared from other gases containing hydrocarbons and from pure or mixed hydrocarbon vapors, such as natural gas rich in methane, coal gas, naphtha, gas oil, and the like.

This invention is not to be limited to any specific examples, which have been submitted herein solely for purpose of illustration, but only by the following claims in which it is desired to claim all novelty insofar as the prior art permits.

I claim:

1. A process for producing hydrogen comprising passing a normally gaseous hydrocarbon and steam at a reaction temperature over a catalyst containing from 5 to 50% by weight of nickel and from 20 to 75% by weight of a phosphate of magnesium, the amount of said phosphate being at least equal in weight to the amount of nickel.

2. Process according to claim 1, in which the catalyst is prepared from a mixture containing nickel and a mixed phosphate of magnesium.

3. Process according to claim 1, in which the catalyst is prepared from a mixture containing nickel and a substantially neutral phosphate of magnesium.

4. Process according to claim 1, in which the catalyst is prepared from a mixture containing nickel and a mixed phosphate of magnesium and an alkali.

5. Process for the production of hydrogen by reaction of hydrocarbon and steam, comprising passing a hydrocarbon vapor and steam at a reaction temperature over a catalyst containing a mixture of a relatively larger amount by weight of a phosphate of magnesium and a relatively smaller amount by weight of a metal selected from the group consisting of iron, nickel and cobalt.

6. Process for the production of hydrogen by reaction of hydrocarbon and steam comprising passing a hydrocarbon gas and steam at a reaction temperature over a catalyst consisting of an intimate mixture of equal amounts by weight of finely divided nickel and magnesium pyrophosphate.

JAMES K. SMALL.